(12) United States Patent
Glaser

(10) Patent No.: US 6,663,002 B2
(45) Date of Patent: Dec. 16, 2003

(54) APPARATUS AND METHOD FOR FACILITATING CREDIT TRANSACTIONS

(76) Inventor: James B. Glaser, 102 Massapog Ave., Sharon, MA (US) 02067

( * ) Notice: Subject to any disclaimer, the term of this patent is extended or adjusted under 35 U.S.C. 154(b) by 206 days.

(21) Appl. No.: 09/929,169

(22) Filed: Aug. 14, 2001

(65) Prior Publication Data

US 2002/0056746 A1 May 16, 2002

Related U.S. Application Data

(60) Provisional application No. 60/225,596, filed on Aug. 15, 2000.

(51) Int. Cl.$^7$ .................................................. G06K 5/00
(52) U.S. Cl. ............................ 235/380; 235/381; 705/36
(58) Field of Search .............................. 705/1, 14, 35, 705/36, 26; 235/380, 381, 375, 379, 382, 382.5, 492

(56) References Cited

U.S. PATENT DOCUMENTS 6,032,136 A * 2/2000 Brake et al. .................. 705/41
6,243,688 B1 * 6/2001 Kalina .......................... 705/14
6,345,261 B1 * 2/2002 Feidelson et al. ............. 705/14
2002/0069150 A1 * 6/2002 Ni ................................ 705/36
2002/0116264 A1 * 8/2002 Feidelson et al. ............. 705/14

FOREIGN PATENT DOCUMENTS

| WO | WO94/04979 | * | 3/1994 |
| WO | WO01/63519 A1 | * | 8/2001 |
| WO | WO02/065246 A2 | * | 8/2002 |

* cited by examiner

Primary Examiner—Thien M. Le
(74) Attorney, Agent, or Firm—Bromberg & Sunstein LLP

(57) ABSTRACT

An apparatus and method of facilitating a credit transaction between a user and a merchant provides a rebate amount that is directed to an investment vehicle. To that end, the method and apparatus receive information indicating that the user is to make a credit transaction with the merchant, and determine a rebate amount for the user for that credit transaction. The rebate amount thus is a function of the credit transaction. Accordingly, as noted above, at least a portion of the rebate amount is directed to be invested in an investment vehicle.

24 Claims, 3 Drawing Sheets

Cardvest™ Calculator

Enter in the amount you project to spend each month and your investment preference to determine how much you will accrue in savings over time.

Average monthly spending: $ [_____]

Choose a vesting plan:   ● Aggressive (anticipated 15% return)
　　　　　　　　　　　　　○ Moderate (10%)
　　　　　　　　　　　　　○ Conservative (5%)
　　　　　　　　　　　　　○ Custom [___]%

[ Calculate ]

APPARATUS AND METHOD FOR FACILITATING CREDIT TRANSACTIONS

PRIORITY

This application claims priority from U.S. patent application Ser. No. 60/225,596, entitled, "REBATE CREDIT CARD," filed on Aug. 15, 2000, the disclosure of which is incorporated herein, in its entirety, by reference.

FIELD OF THE INVENTION

The invention relates generally to facilitating credit transactions and, more particularly, the invention relates to credit vehicles that provide users with a use incentive.

BACKGROUND OF THE INVENTION

In today's economy, people are using credit cards to purchase goods and services more than ever before. Consequently, credit and charge cards ("credit cards") currently are accepted by more traditional merchants that traditionally did not accept credit cards. For example, credit cards now are accepted at gas station pumps, small convenience stores, grocery stores, and even real estate agencies. Credit cards also are used to automatically pay recurring monthly bills, such as utility, telephone and cable television bills.

One widely used type of prior art credit card rebates a percentage of every purchase to the credit card user. This rebate is provided to the user in various forms that encourage future spending. For example, such credit cards may provide a rebate toward the purchase of future goods (e.g., an automobile), or in the form of a cash payment to the user at the end of a twelve month period. With such rebate programs, the amount of the rebate typically increases with increased use of the card.

It also is known that savings rates in the United States are relatively low. It thus is desirable to encourage citizens to save at a greater rate, for example, to ensure a comfortable retirement. Of course, use of prior art rebate credit cards (e.g., those described above) does not encourage saving since rebates typically are spent upon receipt of a check, or used toward future purchases with a partner merchant (e.g., an automobile dealer).

SUMMARY OF THE INVENTION

In accordance with one aspect of the invention, an apparatus and method of facilitating a credit transaction between a user and a merchant provides a rebate amount that is directed to an investment vehicle. To that end, the method and apparatus receive information indicating that the user is to make a credit transaction with the merchant, and determine a rebate amount for the user for that credit transaction. The rebate amount thus is a function of the credit transaction. Accordingly, as noted above, at least a portion of the rebate amount is directed to be invested in an investment vehicle.

In some embodiments, the credit transaction includes an amount of credit requested by the user, and the method and apparatus further direct payment of the amount of credit requested by the user to the merchant. The credit transaction also may include an amount of credit requested by the user, wherein the rebate amount is a percentage of the amount of credit requested by the user. The rebate amount also may be a function of the merchant.

The investment vehicle includes at least one of an annuity, debt security, equity security, certificate of deposit, savings account, retirement account, and insurance product. For example, the investment vehicle may be a mutual fund, variable or fixed annuity, higher education savings account, and/or a bond. In illustrative embodiments, the rebate amount is directed to the investment vehicle after the credit transaction is completed. In still other embodiments, the credit transaction includes use of a credit card. Prior to directing the rebate amount to be invested, some embodiments confirm that that the user has been authorized to make the credit transaction.

Various embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein:

FIG. 3 schematically shows a template that may be used to calculate a user's return.

DESCRIPTION OF ILLUSTRATIVE EMBODIMENTS

In illustrative embodiments of the invention, a user (e.g., a consumer of any good or service) uses a charge card or credit card ("credit card") to purchase a product or service. Consequently, a rebate amount is calculated from each purchase, and at least a portion of such rebate amount is invested in an investment vehicle (e.g., a variable annuity or debt security). After years of regular use of such credit card, a sizeable nest egg can be accumulated for use in any desired manner, such as for support during retirement. Details of various embodiments are discussed below.

Figure 1:
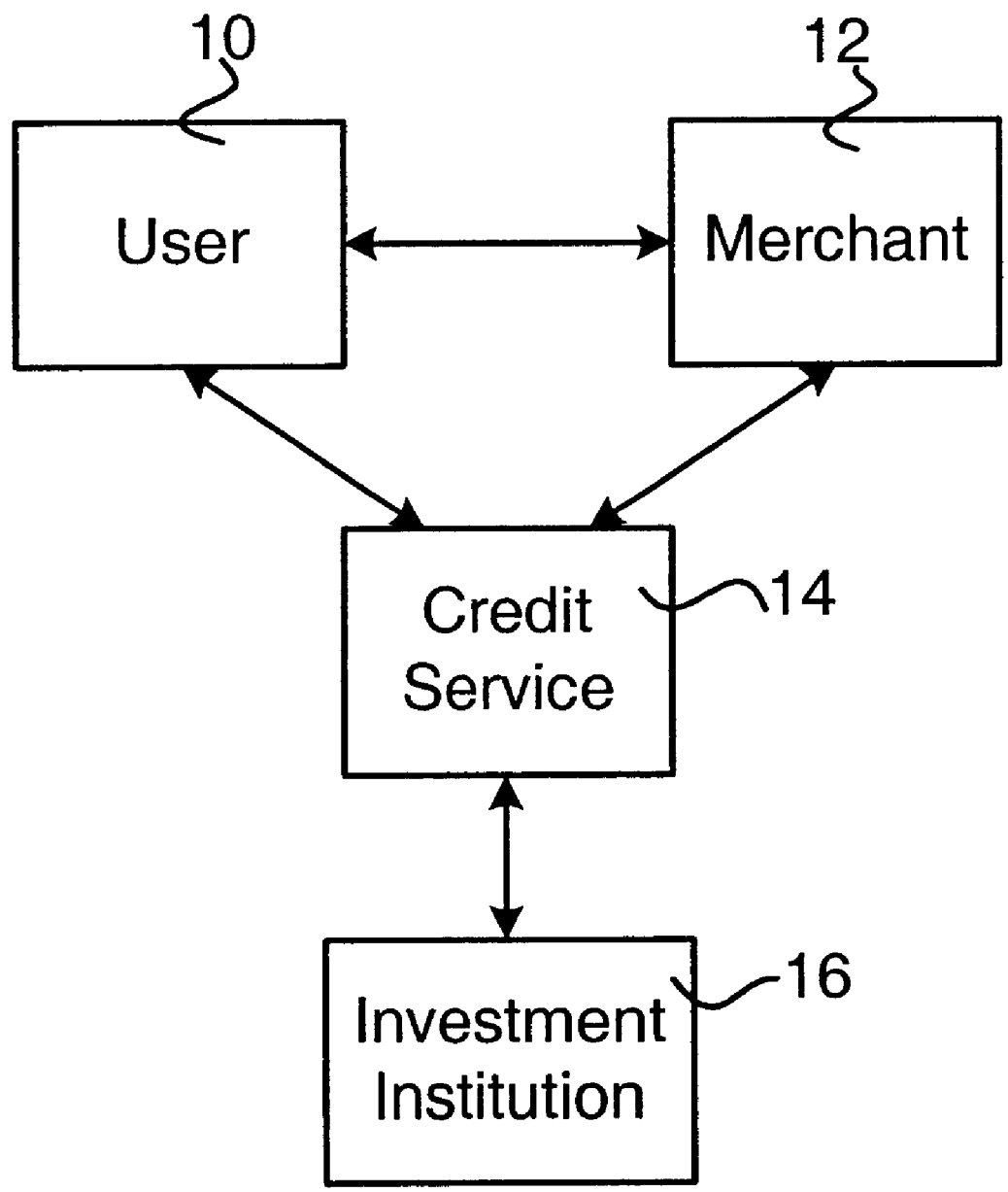
FIG. 1 schematically shows entities involved with illustrative embodiments of the invention.

FIG. 1 schematically shows various entities that may be involved in the implementation of illustrative embodiments of the invention. In particular, a user 10 may use a credit card to purchase goods or services from a merchant 12. Of course, the merchant 12 may be any merchant that accepts credit card payments for the purchase of its goods or services. For example, the merchant 12 can be a restaurant, retail store, Internet site, or gas station. In preferred embodiments, the user 10 is an individual who can invest money in a retirement investment vehicle, such as in a non-qualified annuity or an Individual Retirement Account ("IRA"), in accord with Internal Revenue Service ("IRS") regulations. In alternative embodiments, the user 10 is a company or other business entity that is capable of investing in some investment vehicle as permitted by law.

In addition to the user 10 and merchant 12, a credit service 14 also is involved in the process to complete the credit transaction between the user 10 and the merchant 12. To that end, a credit service 14 may provide a credit card to the user 10, who uses such credit card to purchase goods or services of the merchant 12 against a credit line. For example, the user 10 may have a $5,000 revolving credit line with the credit service 14. Such user 10 thus may charge up to $5,000 on the credit card. It should be noted that the credit line may be either secured or unsecured depending upon the creditworthiness of the user 10.

The merchant 12 thus notifies the credit service 14 of the user's attempt to use such credit card, and the credit service 14 responsively completes the transaction by determining, among other things, whether the user 10 has enough credit to make the purchase. After the user 10 has been approved (i.e., the user 10 has enough credit to make the purchase), the credit service 14 provides a payment, less a service fee (discussed below), to the merchant 12 to pay for the goods or services purchased by the user 10. This payment may be transmitted to the merchant 12 within hours or days of the purchase by the user 10.

In illustrative embodiments, the credit service 14 is affiliated with an investment institution 16 to invest a rebate amount (discussed below) in the name of the user 10. More particularly, the rebate amount may be a sum of money that is calculated based upon one or more factors. As discussed below, those factors may include the total amount spent by the user 10 at such merchant 12, and the identity of the merchant 12. The rebate amount thus may be invested in an investment vehicle managed by the investment institution 16. By way of example, the investment institution 16 may be Fidelity Investments of Boston, Mass.

It should be noted that the functions of the various entities in FIG. 1 can be distributed and/or consolidated. For example, the credit service 14 may have an approval portion (to approve a credit transaction) that is physically and/or logically separated from its rebate portion (to provide a rebate in the form of an investment vehicle). In fact, the approval portion and rebate portion may be separate, independent companies. In a similar manner, the credit service 14 may include an investment institution 16 (i.e., and not require an affiliation with an outside investment institution 16) to provide the necessary investment services. Discussion of the various entities as single entities thus is for discussion purposes only and not intended to limit the scope of the invention.

As compensation for providing the service, the credit service 14 may collect a percentage of the total amount charged by the user 10. For example, this percentage may be those customarily charged by credit card issuers, such as between 0.5 to 5.0 percent. Different rates can apply to different merchants 12 based upon charge volume and other agreements between the merchant 12 and the credit service 14. Other methods of compensating the credit service 14 also may be used, such as by the merchant 12 and/or user 10 paying an annual subscription to the credit service 14. Details of the interaction of the entities shown in FIG. 1 are discussed with regard to FIG. 2.

Figure 2:
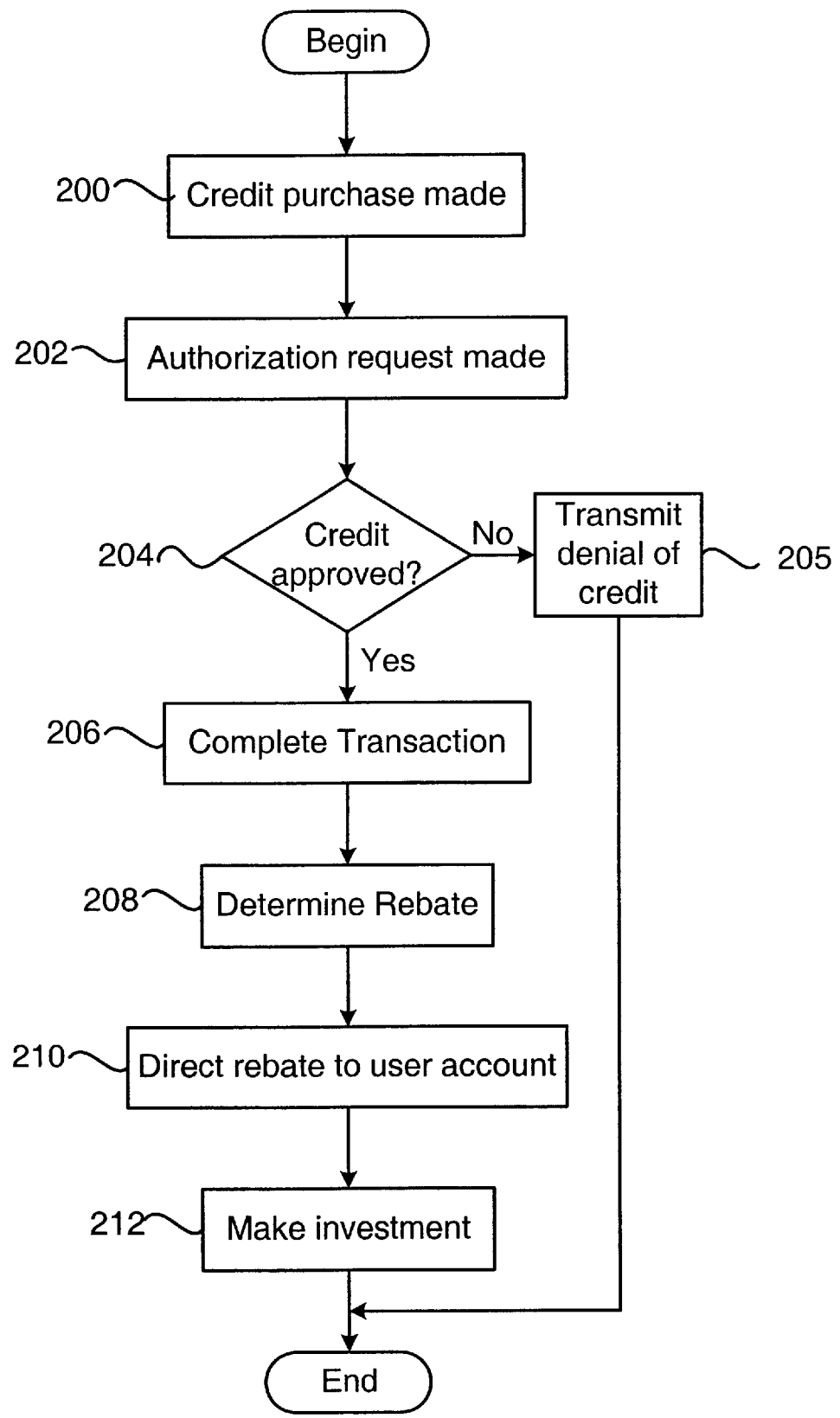
FIG. 2 shows a process of facilitating a credit transaction in accordance with illustrative embodiments of the invention.

FIG. 2 shows a process of facilitating a credit transaction in accordance with illustrative embodiments of the invention. The process begins at step 200, in which a credit purchase is made by the user 10. For example, a user 10 at a retail store may be attempting to use a credit card affiliated with the credit service 14 to pay for goods. Before credit can be authorized, however, an authorization request must be made to the credit service 14 to determine if the user 10 has enough credit to make the purchase (step 202). To that end, a cashier, for example, may pass the credit card through a credit card reader, which sends a message to the credit service 14 to determine if the user 10 has enough credit. The message may be transmitted in a well-known manner, such as by use of a modem connection between the merchant 12 and the credit service 14.

The credit service 14 then determines (at step 204) if the credit authorization can be approved. To that end, the credit service 14 determines if the credit card is still active, and if the addition of the amount that the user 10 is attempting to purchase is above a preset credit limit. In some embodiments, however, no credit limit is set and thus, this part of step 204 may be omitted. Other known factors also may be taken into account to determine if the purchase is to be authorized.

If credit is not approved, then the process continues to step 205, in which a denial of credit is transmitted to the merchant 12. Consequently, the credit card cannot be used for the requested purchase. Conversely, if the credit request is approved, then the process continues to step 206, in which the transaction is completed. Specifically, the credit service 14 transmits an approval message to the merchant 12, indicating that the user 10 has enough credit to make the purchase. The credit service 14 then makes a conditional charge against the user's credit line, thus increasing the amount owed to the credit service 14. The amount of the purchase then may be stored in a database to provide a future payment to the merchant 12 for the goods purchased.

The process then continues to step 208, in which the credit service 14 determines a rebate amount to allocate for the user 10. The rebate amount may be calculated in many different manners by using formulas of varying complexity. The various formulas may depend upon a number of parameters, such as the amount charged, the total amount charged since a specified date, the identity of the user 10, the length of time the user 10 has been using the credit card, and some flat fee rebate for each purchase or group of purchases.

In illustrative embodiments, however, the rebate amount merely is calculated as a percentage of the amount charged on each transaction. For example, if the rebate amount is set at 1.5 percent and the user 10 charged $1000, then the rebate amount would be fifteen dollars. In other embodiments, the rebate amount is increased based upon the identity of the merchant 12. For example, a set of merchants 12 ("participating merchants 12") may agree to provide an additional two percent rebate for all customers using the credit card of the credit service 14. Accordingly, for a $1,000 charge, if the rebate amount is set at 1.5 percent plus two percent for participating merchants 12, then the rebate amount would be thirty-five dollars if the purchase is made from participating merchants 12. As compensation for its services, the service provider 14 may collect a service charge for each transaction. Continuing with the previous example, with a service charge of one percent for each transaction, the credit service 14 would collect ten dollars for the exemplary transaction. The balance of the purchase price then may be paid to the merchant 12 as compensation for the purchase.

The rebate amount then is directed to an account specified for the user 10 (step 210). In illustrative embodiments, this account may be resident at the financial institution. The rebate amount then may be invested in the manner specified in the user agreement (step 212). In particular, the user agreement may specify that the credit service 14 and/or financial institution 16 can select the investment vehicle that is to be used. In other embodiments, however, the user 10 selects the appropriate investment vehicle.

In alternative embodiments, only a portion of the rebate amount may be invested in an investment vehicle. The remainder of the rebate amount thus may be directed to other sources, such as to a charity, or directly to the user 10 at the end of a given period. This embodiment may be used as incentive to attract less saving oriented users 10.

The investment vehicle can be any investment product known in the art, such as those provided by Fidelity Investments. By way of example, the investment vehicle may be a variable or fixed annuity, debt security, equity security, mutual fund, insurance product (e.g., whole life insurance), savings account, or certificate of deposit. The investment vehicle may be within or outside of a retirement account (e.g., an IRA). In addition, the investment vehicle can be other types of investment vehicles recognized by the Internal Revenue Service as codified by the United States Code and/or in accord with state and local law. For example, the investment vehicle can be an educational savings fund, such as a so-called "Section 529"fund.

Before the transaction discussed above can take place, however, the user 10 must sign-up for use of these services with the credit service 14. To that end, the credit service 14 may make background checks that are common in the credit card industry, such as by retrieving the user's credit history from a credit bureau, and checking the user's references and employment history. In addition, as suggested above, the user 10 may determine the appropriate investment vehicle to use. Specifically, a set of investment vehicles may be listed by the credit service 12, and the user 10 may select one or more as desired and/or deemed appropriate. In other embodiments, the user 10 enters personal information, such as age, salary, and risk tolerance information. The credit service 14 then may select an appropriate investment vehicle for the user 10.

In illustrative embodiments, the credit service 14 is implemented as a network site within a public network. For example, the credit service 14 may be a World Wide Web ("WWW") site on the Internet. Accordingly, the user 10 may sign up for the service via an encrypted channel, and information relating to the user 10 may be stored in a secure server maintained by the credit service 14. In addition, the user 10 may check balances in the investment vehicles for such user's account via the WWW.

FIG. 3 schematically shows a template that may be provided by the WWW site of the credit service 14 to project the user's total savings over time. In particular, the template may include a field for entering the user's average monthly spending with the credit card, and a plurality of radio buttons relating to the anticipated return. The radio buttons permit the user 10 to select from an aggressive portfolio return (15% return), moderate portfolio return (10% return), conservative portfolio return (5% return), or some other return as entered by the user 10. After entering the appropriate information, the calculate button is selected to yield the results.

Conventional calculation programs and methods may be used to calculate the projected amount. The following values can be used as an example of the projected nest egg that can be accumulated using illustrative embodiments:

1.5% of all purchases are included in the rebate amount;
an additional 3.0% of all participating merchant purchases also are included in the rebate amount (thus providing a rebate amount of 4.5% if a purchase is made at a participating merchant 12);
30% of all purchases are made at participating merchants 12 (this produces a weighted average of 1.95% for the rebate amount);
the investment vehicle is an aggressive portfolio (assuming 15% returns); and $2,000 annually is spent on the credit card at participating and nonparticipating merchants 12.
These values produce the following results:

| Year | Earnings |
| --- | --- |
| year 1: | $468.00 |
| year 2: | $1,006.20 |
| year 3: | $1,625.13 |
| year 4: | $2,336.90 |
| year 5: | $3,155.43 |
| year 10: | $9,502.14 |
| year 25: | $99,587.13 |
| year 40: | $832,614.26 |
| year 50: | $3,377,891.22 |

Some embodiments of the invention may be implemented at least in part in any conventional computer programming language. For example, some embodiments may be implemented in a procedural programming language (e.g., "C") or an object oriented programming language (e.g., "C++"). Alternative embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

I claim:

1. A method of facilitating a credit transaction between a user and a merchant, the method comprising:
   receiving information indicating that the user is to make a credit transaction with the merchant;
   determining a rebate amount for the user, the rebate amount being a function of the credit transaction; and
   directing that at least a portion of the rebate amount be invested in an investment vehicle without being commingled with rebate amounts of other users before being invested in the investment vehicle.

2. The method as defined by claim 1 wherein the credit transaction includes an amount of credit requested by the user, the method further comprising:
   directing the payment of the amount of credit requested by the user to the merchant.

3. The method as defined by claim 1 wherein the credit transaction includes an amount of credit requested by the user, wherein the rebate amount is a percentage of the amount of credit requested by the user.

4. The method as defined by claim 3 wherein the rebate amount is a function of the merchant.

5. The method as defined by claim 1 wherein the investment vehicle includes at least one of an annuity, debt security, equity security, certificate of deposit, savings account, retirement account, and insurance product.

6. The method as defined by claim 1 wherein the rebate amount is directed after the credit transaction is completed.

7. The method as defined by claim 1 wherein the credit transaction includes use of a credit card.

8. The method as defined by claim 1 further comprising:
   confirming that the user has been authorized to make the credit transaction, the act of directing being a function of the act of confirming.

9. An apparatus for facilitating a credit transaction between a user and a merchant, the apparatus comprising:
   an input for receiving information indicating that the user is to make a credit transaction with the merchant;
   logic for determining a rebate amount for the user, the logic for determining being responsive to the received information, the rebate amount being a function of the credit transaction; and
   an investment module operatively coupled with the logic for determining, the investment module directing that at least a portion of the rebate amount be invested in an investment vehicle without being commingled with rebate amounts of other users before being invested in the investment vehicle.

10. The apparatus as defined by claim 9 wherein the credit transaction includes an amount of credit requested by the user, the apparatus further comprising:
    means for directing the payment of the amount of credit requested by the user to the merchant.

11. The apparatus as defined by claim 9 wherein the credit transaction includes an amount of credit requested by the user, wherein the rebate amount is a percentage of the amount of credit requested by the user.

12. The apparatus as defined by claim 11 wherein the rebate amount is a function of the merchant.

13. The apparatus as defined by claim 9 wherein the investment vehicle includes at least one of an annuity, debt security, equity security, certificate of deposit, savings account, retirement account, and insurance product.

14. The apparatus as defined by claim 9 further comprising:
    means for confirming that the user has been authorized to make the credit transaction.

15. A computer program product for use on a computer system for facilitating a credit transaction between a user and a merchant, the computer program product comprising a computer usable medium having computer readable program code thereon, the computer readable program code comprising:
    program code for receiving information indicating that the user is to make a credit transaction with the merchant;
    program code for determining a rebate amount for the user, the rebate amount being a function of the credit transaction; and
    program code for directing that at least a portion of the rebate amount be invested in an investment vehicle without being commingled with rebate amounts of other users before being invested in the investment vehicle.

16. The computer program product as defined by claim 15 wherein the credit transaction includes an amount of credit requested by the user, the computer program product further comprising:
    program code for directing the payment of the amount of credit requested by the user to the merchant.

17. The computer program product as defined by claim 15 wherein the credit transaction includes an amount of credit requested by the user, wherein the rebate amount is a percentage of the amount of credit requested by the user.

18. The computer program product as defined by claim 17 wherein the rebate amount is a function of the merchant.

19. The computer program product as defined by claim 15 wherein the investment vehicle includes at least one of an annuity, debt security, equity security, certificate of deposit, savings account, retirement account, and insurance product.

20. The computer program product as defined by claim 15 further comprising:
    program code for confirming that the user has been authorized to make the credit transaction, the program code for directing being a function of the program code for confirming.

21. A computer program product for use on a computer system for facilitating a credit transaction between a user and a merchant, the computer program product comprising a computer usable medium having computer readable program code thereon, the computer readable program code comprising:
    program code for receiving information indicating that the user is to make a credit transaction with the merchant;
    program code for determining a rebate amount for the user, the rebate amount being a function of the credit transaction; and
    program code for directing that at least a portion of the rebate amount be invested in an investment vehicle selected by the user.

22. The computer program product as defined by claim 21 wherein the investment vehicle includes at least one of an annuity, debt security, equity security, certificate of deposit, savings account, retirement account, and insurance product.

23. A computer program product for use on a computer system for facilitating a credit transaction between a user and a merchant, the computer program product comprising a computer usable medium having computer readable program code thereon, the computer readable program code comprising:

program code for receiving information indicating that the user is to make a credit transaction with the merchant;

program code for determining a rebate amount for the user, the rebate amount being a function of the credit transaction; and program code for directing that at least a portion of the rebate amount be invested in an investment vehicle, wherein the investment vehicle is within a retirement account.

24. The computer program product as defined by claim 23 wherein the investment vehicle includes at least one of an annuity, debt security, equity security, certificate of deposit, savings account, and insurance product.

* * * * *